(12) United States Patent
Barsari et al.

(10) Patent No.: US 11,588,352 B2
(45) Date of Patent: Feb. 21, 2023

(54) INDUCTIVE POWER TRANSFER COUPLER ARRAY

(71) Applicant: Auckland Uniservices Limited, Auckland (NZ)

(72) Inventors: Vahid Zahiri Barsari, Auckland (NZ); Grant Anthony Covic, Auckland (NZ); Duleepa Jayanath Thrimawithana, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 17/396,000

(22) Filed: Aug. 6, 2021

(65) Prior Publication Data

US 2022/0029458 A1 Jan. 27, 2022

Related U.S. Application Data

(63) Continuation of application No. PCT/IB2020/051036, filed on Feb. 10, 2020.

(30) Foreign Application Priority Data

Feb. 8, 2019 (NZ) ........................ 750549

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *H02J 50/402* (2020.01); *H02J 50/90* (2016.02); *H04B 5/0037* (2013.01)

(58) Field of Classification Search
None
See application file for complete search history.

(56) References Cited

U.S. PATENT DOCUMENTS

| | | | |
|---|---|---|---|
| 9,156,364 B2 | 10/2015 | Miller et al. | |
| 2011/0151141 A1* | 6/2011 | Upadhyaya | ....... H01J 37/32596 |
| | | | 118/723 E |

(Continued)

FOREIGN PATENT DOCUMENTS

| | | |
|---|---|---|
| WO | 2015038010 A1 | 3/2015 |
| WO | 2018115991 A1 | 6/2018 |

OTHER PUBLICATIONS

International Search Report and Written Opinion in counterpart International Application No. PCT/US2020/051036, dated Feb. 10, 2020, 10 pages.
Li, Hao Leo, "High Frequency Power Converters Based on Energy Injection Control for IPT Systems", Department of Electrical and Computer Engineering, The University of Auckland, Jan. 2011, 216 pages.

(Continued)

*Primary Examiner* — Adi Amrany
(74) *Attorney, Agent, or Firm* — Edell, Shapiro & Finnan, LLC

(57) ABSTRACT

An inductive or wireless power transfer coupler array has at least two coupler modules connected in parallel to a common power source. Each coupler module comprises
a resonant circuit, including at least one transmitter coil and a capacitive element. Each of the coupler modules is connected to a second terminal of the power source across the respective resonant circuit by a corresponding pair of switching elements,
and each coupler module is linked with at least one other coupler module at a shared one switching element of the corresponding pair of switching elements. A control module is configured to effect control between the active state and the passive state by controlling the phase angle of the corresponding pair of switching elements.

20 Claims, 13 Drawing Sheets

(51) Int. Cl.
  *H02J 50/40* (2016.01)
  *H02J 50/90* (2016.01)
  *H04B 5/00* (2006.01)

(56) References Cited

U.S. PATENT DOCUMENTS

| | | | |
|---|---|---|---|
| 2012/0217111 A1 | 8/2012 | Boys et al. | |
| 2012/0248892 A1 | 10/2012 | Covic et al. | |
| 2015/0207335 A1* | 7/2015 | Madawala | H02J 50/40 |
| | | | 307/104 |
| 2017/0033693 A1* | 2/2017 | Madawala | H01F 38/14 |
| 2017/0222490 A1 | 8/2017 | Boys et al. | |
| 2017/0271923 A1* | 9/2017 | Kim | H02J 50/12 |
| 2017/0358954 A1 | 12/2017 | Ren | |
| 2018/0233953 A1 | 8/2018 | Thrimawithana et al. | |
| 2018/0233955 A1* | 8/2018 | Park | H02J 50/40 |
| 2019/0013699 A1* | 1/2019 | Avestruz | H04B 5/0037 |
| 2019/0084433 A1* | 3/2019 | Wang | H02J 50/80 |

OTHER PUBLICATIONS

Extended European Search Report in counterpart Application No. 20752735.9-1202, dated Oct. 12, 2022, 11 pages.

S. M. Asif et al, "A Bi-directional Inductive Power Transfer System with Individually Controlled Tracks and Pick-ups" 2013 IEEE ECCE Asia Downunder, IEEE, Jun. 3, 2013 (Jun. 3, 2013), pp. 1059-1064, XP032475321, DOI: 10.1109/ECCE-ASIA.2013.6579239 ISBN: 978-1-4799-0483-9.

Boys John T et al, "The Inductive Power Transfer Story at the University of Auckland", IEEE Circuits and Fechnical Fields Systems Magazine, Searched (IPC), vol. 15, No. 2, May 21, 2015 (May 21, 2015), pp. 6-27, XP011582134, HO2J, ISSN: 1531-636X, DOI: B60L, 10.1109/MCAS.2015.2418972.

Vagendra Ganesh R et al: "Detection of 6-8 EVs on IPT Highways", IEEE Journal of Emerging and Selected Topics in Power Electronics, IEEE, Piscataway, NJ, USA vol. 2, No. 3, Sep. 1, 2014 (Sep. 1, 2014), pp. 584-597, xP011554811, ISSN: 2168-6777, DOI: 10.1109/JESTPE.2014.2308307.

* cited by examiner

INDUCTIVE POWER TRANSFER COUPLER ARRAY

The present invention relates to an inductive power transfer (IPT) coupler array.

BACKGROUND

Inductive power transfer (IPT), also referred to as wireless power transfer (WPT) is gaining popularity as a means of transferring electrical power between two systems without any physical contact. This technology has been used to provide power in a variety of consumer and industrial applications. One of the promising applications of IPT systems is to charge/power electric vehicles (EVs). Another application is charging mobile electronic devices such as mobile telephones, tablets and laptops. In this disclosure reference is made to EV applications as a primary example, but the disclosed subject matter is equally applicable to other charging or powering applications. In a stationary EV charging application, power transmission to the EV can take place more conveniently when the vehicle is parked over a primary coupler module (transmitter coil). In contrast, dynamic or in-motion IPT systems aim to transfer energy to EVs driven over an electrified highway. An electrified highway utilizes an array of embedded coupler modules beneath the road surface, which are energized as an EV is driven over. Dynamic charging helps to recharge the on-board battery of an EV frequently, thereby reducing its size and improving its lifetime. As such, recent research focus in the field of IPT has shifted towards the development of robust, reliable and economically feasible infrastructure for dynamic IPT systems.

An electrified roadway can either be constructed using distributed or lumped coupler modules. In a distributed system, an elongated track is buried under the road surface to act as a power coupler (transmitter). Although the advantage of requiring a single converter to energize a long track makes the distributed system economically viable, the generation of stray electromagnetic fields (EMF) is a major concern. In addition, such a system exhibits poor efficiency as the entire track has to be energized regardless of the number of vehicles over it. From a maintenance point of view, it may also be difficult to replace the entire track in case of a fault. To address these issues, lumped dynamic IPT systems have been introduced. In a lumped IPT system, the primary (transmitter) side is made up of an array of multiple discrete couplers that are evenly spaced along the road. Each coupler module is only energized when it is in the vicinity of the pick-up coupler (receiver coil) mounted under the EV. Since each primary coupler module is only energized for a short duration as an EV is driven over it, a lumped dynamic IPT system can achieve a significantly higher efficiency. However, this demands a larger number of primary coupler modules that can be energized independently. Most solutions proposed to-date, employ a separate power converter and the associated circuitry to energize each coupler module independently.

In order to reduce the cost and the complexity of a lumped dynamic IPT system, a number of novel power converter topologies have been developed in the past. These systems commonly employ voltage source inverters (VSI) such as full-bridge or half-bridge converters to drive an array of primary couplers. In some prior art applications, bi-directional AC switches are used as a means of connecting each coupler with a common inverter. This requires a somewhat complex control method to ensure zero current switching (ZCS) or zero voltage switching (ZVS) of the AC switches. A cross-segmented power supply rail with an auto-compensation switch box has been proposed in the prior art to reduce the construction cost of a semi-lumped dynamic IPT system. Such systems may utilize 4 conductors together with bi-directional switches to change the current direction in the inner power cables. When the current direction of the inner cables is the same as the outer cables, the corresponding short segment of the road is energized. A segment is deactivated by reversing the current direction in the inner conductors. Additional coupling transformers with capacitors are necessary in each segment to compensate for the variable line inductance of the cables. Other configurations have been proposed to avoid the need for bi-directional AC switches. Similar to other methods, a common full-bridge inverter is used to drive multiple coupler modules in these configurations. However, a standard DC switch is placed in series with the DC blocking capacitor employed in each compensation network to activate and deactivate a segment. This series capacitor increases the voltage stress across the switch to at least twice the DC-link voltage driving the primary inverter. Moreover, it is also possible to use a common half-bridge that is connected to one end of all the coupler modules, while the other end of each coupler module is driven by its own half-bridge. Unfortunately, in configurations where a common inverter is used, the inverter needs to be rated to the maximum number of coupler modules it is expected to drive simultaneously. As such, a common inverter is only used to drive a very limited number of coupler modules to keep its cost and size acceptable.

To address some of these issues associated with driving a lumped coupler array of a large-scale-IPT system, the present invention discloses a low-cost converter topology that overcomes the problems related to the prior art solutions at least to some extent. In some embodiments of the invention, a current sourced push-pull converter topology is used, which may also be referred to as a Push-Pull driven Coupler Array (PPCA). In other embodiments of the invention, a half-bridge topology is used.

The invention enables each coupler module to be energized independently using a standard semiconductor switch such as a MOSFET or an IGBT. This switch is shared with the neighbouring coupler module, and as such each switch only carries up to twice the rated current required to energize the coupler module it is associated with. This allows the system to have any number of coupler modules energized simultaneously without proportionally increasing the current stresses on the switches. In addition, the switches only provide the real power required to drive the coupler modules. They do not conduct the resonant current that is circulating in the parallel tuned LC network. A general description of the proposed PPCA and its control is presented in the next section. Simulation results are then presented to verify the viability of the proposed approach.

BRIEF SUMMARY OF THE INVENTION

According to one aspect the disclosure provides an inductive power transfer (IPT) coupler array, comprising a plurality of coupler modules, wherein each of the plurality of coupler modules comprises a resonant circuit including at least one transmitter coil and a capacitive element, wherein each resonant circuit has a first end and a second end that are each connected to a first side of a power source; a plurality of switching elements, wherein each of the plurality of coupler modules is connected to a second side of the power source by a respective pair of switching elements of the plurality of switching elements, wherein each pair of switching elements comprises at least one shared switching element that forms part of another pair of switching elements such that each of the plurality of coupler modules is linked with at least one other of the other plurality of modules via a respective at least one shared switching element; a control module configured to control operation of each of the plurality of coupler modules between an active state in which the respective transmitter coil is energized, and a passive state in which the respective transmitter coil is not energized, wherein the control module is configured to effect control between the active state and the passive state of a selected coupler module by controlling at least one of a phase angle or a duty-cycle of the respective pair of switching elements connecting the selected coupler module to the second side of the power source.

According to another aspect the disclosure provides an inductive power transfer (IPT) coupler array, comprising
  at least two coupler modules, each coupler module comprising a resonant circuit, including at least one transmitter coil and a capacitive element,
  each of the coupler modules being connected to a power source by corresponding switching elements,
  wherein each coupler module is linked with at least one other coupler module at a shared one or more switching element(s) of the corresponding switching elements;
  a control module configured to control operation of each of the coupler modules between an active state in which the respective transmitter coil is energised, and a passive state in which the respective transmitter coil is not energised,
  wherein the control module is configured to effect control between the active state and the passive state by controlling the phase angle or duty-cycle of the corresponding switching elements.

In general, an inductive power transfer (IPT) coupler array presented herein includes a plurality of switching elements. Reference to "corresponding switching elements" refers to a pair of the plurality of switching elements that is associated with a respective coupler module.

Preferably the modules are connected in parallel or series to a common power source.

Preferably a current or voltage splitter is provided between the power source and the resonant circuit. Preferably the current or voltage splitter connects each side of the resonant circuit to a first terminal of the power source.

Preferably each of the coupler modules is connected to a second terminal of the power source by corresponding switching elements.

Preferably, the push-pull converter can be operated in an autonomous mode.

Preferably the push-pull converter can be operated in an autonomous mode at ZVS frequency.

According to another aspect of the invention, there is provided
  an inductive power transfer (IPT) coupler array, comprising
    at least two coupler modules connected in parallel to a common power source,
    each coupler module comprising
      a resonant circuit, including at least one transmitter coil and a capacitive element,
      a current splitter connected across the resonant circuit to connect each side of the resonant circuit to a first terminal of the power source,
    each of the coupler modules being connected to a second terminal of the power source across the respective resonant circuit by a corresponding pair of switching elements,
    wherein each coupler module is linked with at least one other coupler module at a shared one switching element of the corresponding pair of switching elements;
    a control module configured to control operation of each of the coupler modules between an active state in which the respective transmitter coil is energised, and a passive state in which the respective transmitter coil is not energised,
    wherein the control module is configured to effect control between the active state and the passive state by controlling the phase angle of the corresponding pair of switching elements.

Preferably, the switching elements are semiconductor switches.

Preferably, the control module is configured to switch each pair of switching elements at a phase angle of 180 degrees to operate the respective coupler module in the activate state, and at a phase angle of 0 degrees to operate the coupler module in the passive state.

Preferably, the control module is configured to switch all switching elements at an identical fixed switching frequency.

Preferably, all of the coupler modules have the same resonant frequency, and wherein the switching frequency is lower than or equal to this resonant frequency to achieve zero voltage switching (ZVS).

Preferably, the resonant circuit is a parallel or series resonant circuit.

Preferably, the resonant circuit is a push-pull or half bridge circuit.

Preferably, each current splitter comprises at least two inductances.

Preferably, the inductances are coupled with a magnetically permeable core.

Preferably, each coupler module comprises at least two transmitter coils.

Preferably, the at least two transmitter coils are at least partially overlapping.

Preferably, an overlap between the at least two transmitter coils is chosen such that the at least two transmitter coils are mutually decoupled.

Preferably, at least each two of the coupler modules are arranged such that the respective transmitter coils of the coupler modules are overlapping.

Preferably, in each set of overlapping transmitter coils an overlap is chosen such that the transmitter coils are mutually decoupled.

According to another aspect of the invention, there is provided an inductive power transfer (IPT) coupler array, comprising
  at least two coupler modules connected in parallel to a common power source,
  each coupler module comprising a resonant circuit including at least one transmitter coil and a capacitive element,
  wherein a first and a second pair of switching elements are connected across the resonant circuit to terminals of the power source in a half-bridge configuration,
  wherein each coupler module is linked with at least one other coupler module at a shared pair of switching elements, each shared pair of switching elements including one switching element of the respective first and second pairs of switching elements;

a control module configured to selectively control the operation of each of the coupler modules between an active state in which the respective transmitter coil is energised, and a passive state in which the respective transmitter coil is not energised, wherein the control module is configured to effect control between the active state and the passive state by controlling the phase angle of the corresponding first and second pairs of switching elements.

According to another aspect of the invention, there is provided an inductive power transfer (IPT) coupler array, comprising at least two coupler modules connected in parallel to a common power source, each coupler module comprising a resonant circuit including at least one transmitter coil and a capacitive element, wherein the resonant circuit is connected to terminals of the power source in a push-pull configuration or in a half-bridge configuration by at least two switching elements connected across the resonant circuit, wherein each coupler module is linked with at least one other coupler module at a shared at least one switching element;

a control module configured to selectively control the operation of each of the coupler modules between an active state in which the respective transmitter coil is energised, and a passive state in which the respective transmitter coil is not energised, wherein the control module is configured to effect control between the active state and the passive state by controlling the phase angle of the corresponding switching elements connected across the respective resonant circuit.

According to another aspect of the disclosure, there is provided an inductive power transfer (IPT) system comprising a plurality of coupler arrays, each coupler array comprising at least two IPT coupler modules, each coupler module having a coupling coil, wherein the individual coupler modules or coils of each array are spatially arranged in an intermingled manner such that adjacent coupler modules or coils are part of different arrays.

Preferably, all coupler arrays are energised by a common power source.

Preferably, the inductive power transfer (IPT) coupler system includes means to individually adjust a phase difference between individual coupler arrays.

Preferably, the current in the transmitter coils of each coupler array can be controlled independently of the other array either using a switching element between the power source and the array or by controlling the corresponding switching elements Preferably, the control modules of the coupler arrays are integrated in a common controller controlling switching of all coupler modules.

Preferably, the coupler arrays are tuned to operate at individual resonance frequencies.

Preferably, the coupler arrays are tuned such that each coupler array operates at a predetermined resonance frequency or operated in autonomous mode at ZVS frequency.

Preferably, corresponding coupler modules of each coupler array are arranged such that the respective transmitter coils of the coupler modules at least partially overlap.

Preferably, an overlap is chosen such that the transmitter coils are mutually decoupled.

Preferably each of the coupler modules is connected to a power source by corresponding switching elements, wherein each coupler module is linked with at least one other coupler module at a shared one or more switching element(s) of the corresponding switching elements.

According to another aspect of the invention, there is provided an inductive power transfer (IPT) coupler system comprising at least one coupler leg, each coupler leg comprising at least two IPT coupler arrays as disclosed above, wherein in each coupler leg, the individual coupler modules of the at least two IPT coupler arrays are spatially arranged in an interleaved manner such that adjacent coupler modules are part of different coupler arrays.

Preferably, all coupler legs are energised by a common power source.

Preferably, the inductive power transfer (IPT) coupler system includes means to individually adjust a phase difference between individual coupler arrays.

Preferably, the control modules of the coupler arrays are integrated in a common controller controlling switching of all coupler modules.

Preferably, in each coupler leg, the coupler arrays are tuned to operate at individual resonance frequencies.

Preferably, the coupler arrays are tuned such that each coupler array operates at a predetermined resonance frequency.

Preferably, corresponding coupler modules of each coupler leg are arranged such that the respective transmitter coils of the coupler modules at least partially overlap.

Preferably, an overlap is chosen such that the transmitter coils are mutually decoupled.

As used herein the term "and/or" means "and" or "or", or both. As used herein "(s)" following a noun means the plural and/or singular forms of the noun. The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner. It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7). The entire disclosures of all applications, patents and publications, cited above and below, if any, are hereby incorporated by reference.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Other aspects of the invention may become apparent from the following description which is given by way of example only and with reference to the accompanying drawings.

BRIEF DESCRIPTION OF PREFERRED EMBODIMENTS OF THE INVENTION

Figure 1:
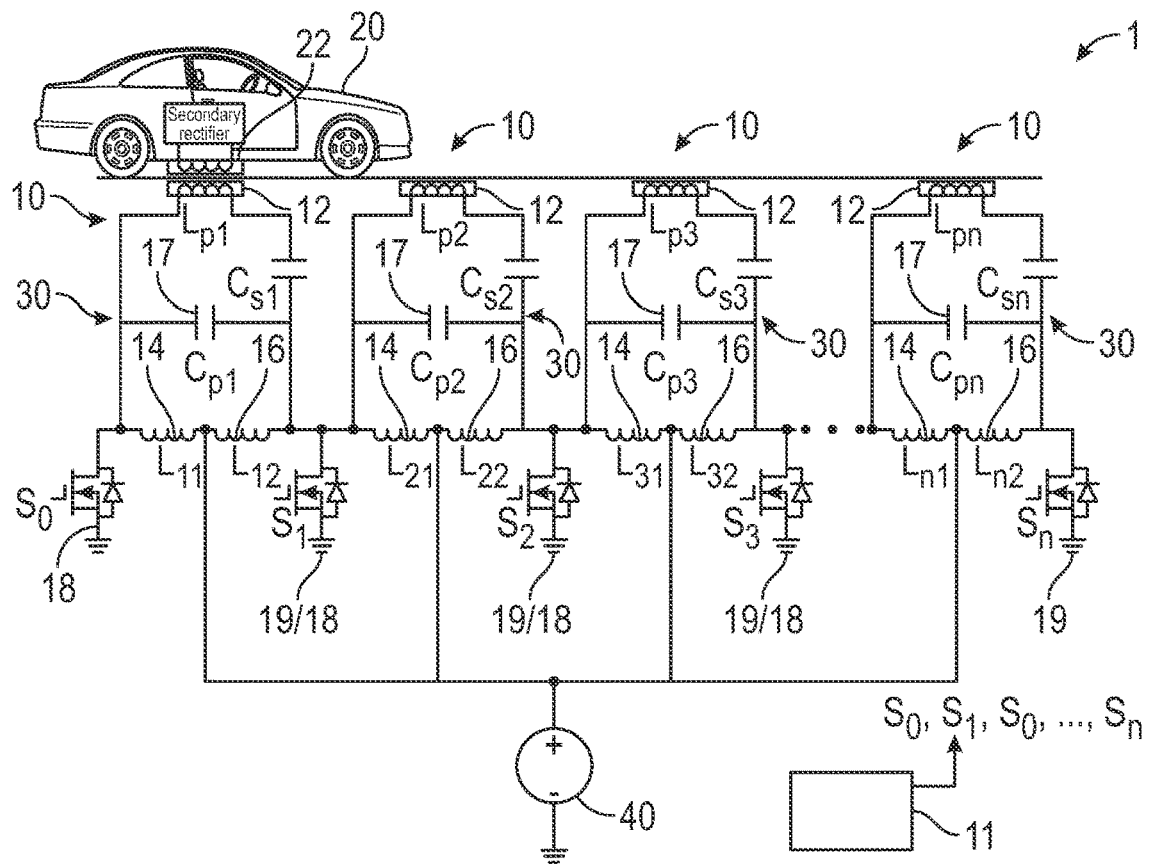
FIG. 1 shows a push-pull driven coupler array according to an embodiment of the invention.

A system diagram of a dynamic IPT array 1 according to an embodiment or example of the invention is illustrated in FIG. 1. In this embodiment, the coupler array 1 utilizes a push-pull topology and comprises N coupler modules 10 which are all connected in parallel to a common power source 40. Each coupler module 10 of this system comprises a parallel resonant circuit 30 having a transmitter coil 12, which may also be referred to as a primary coupler, and compensation components, i.e. at least one capacitor 17. In the shown embodiment, each coupler module further comprises a current splitter having two DC inductors 14, 16. The current splitter is connected across the resonant circuit 30 to connect each side of the resonant circuit 30 to a first terminal of the power source 40. The transmitter coil 12 (primary coupler) is only energized when it is in the vicinity of the pick-up coupler 22 (receiver) mounted under an electric vehicle (EV) 20.

The skilled person will appreciate that each of the coupler modules 10 is connected to a second terminal of the power source 40 across the respective resonant circuit 30 by a corresponding pair of switching elements 18, 19.

As can be seen in FIG. 1, each coupler module 10 is linked with at least one other coupler module 10 at a shared one switching element of the corresponding pair of switching elements 18, 19. The character of these switches of belonging to two coupler modules 10 at a time is indicated in the Figures by a shared reference number 18/19.

The coupler array furthermore comprises a control module 11 configured to control operation of each of the coupler modules 10 between an active state in which the respective transmitter coil 12 is energised, and a passive state in which the respective transmitter coil 12 is not energised.

According to the invention, the control module is configured to effect control between the active state and the passive state by controlling the phase angle of the corresponding pair of switching elements 18, 19 belonging to the respective module 10.

Figure 2:
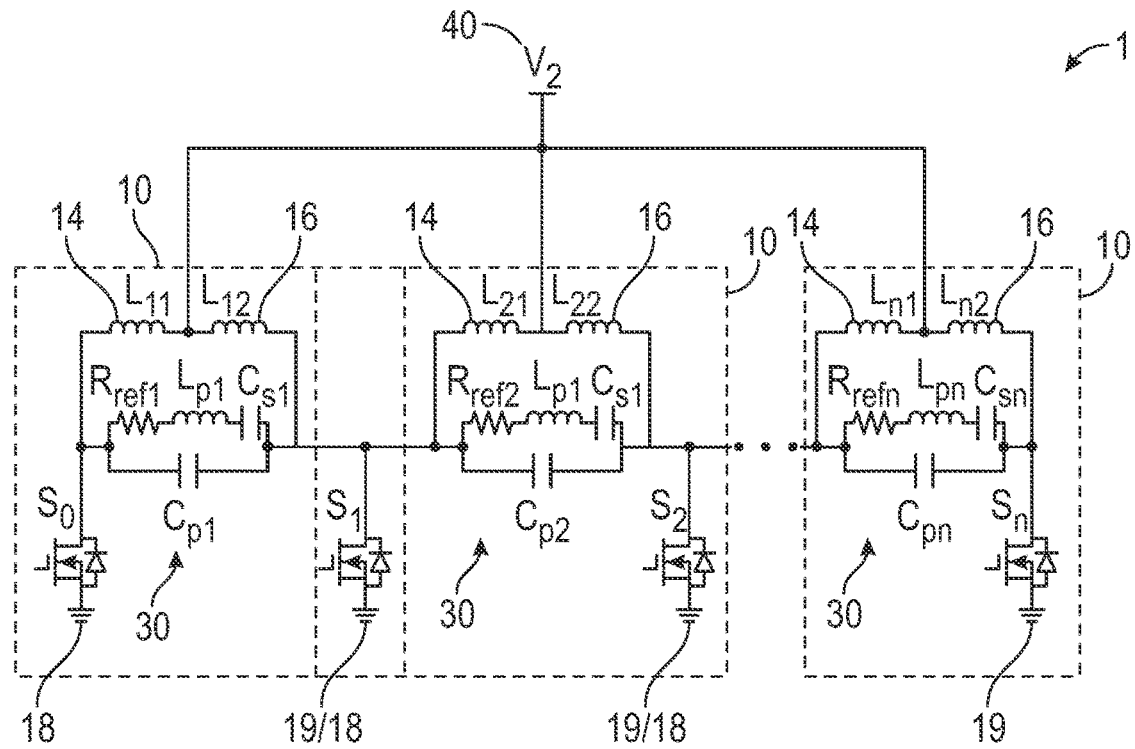
FIG. 2 shows a simplified circuit model of the PPCA according to an embodiment of the invention

A simplified schematic of the proposed PPCA is shown in FIG. 2, where the EV load is represented as a reflected impedance comprising $R_{refn}$ and an imaginary component which is absorbed into the primary coupler inductance, $L_{pn}$. It should be noted that 'n' represents the module number. Typically, all switches 18, 19 in the array 1 operate at a fixed frequency, $f_{sw}$, at either a 0° or a 180° phase-shift with respect to the phase of the first switch 18 of the first coupler module 10.

Figure 3:
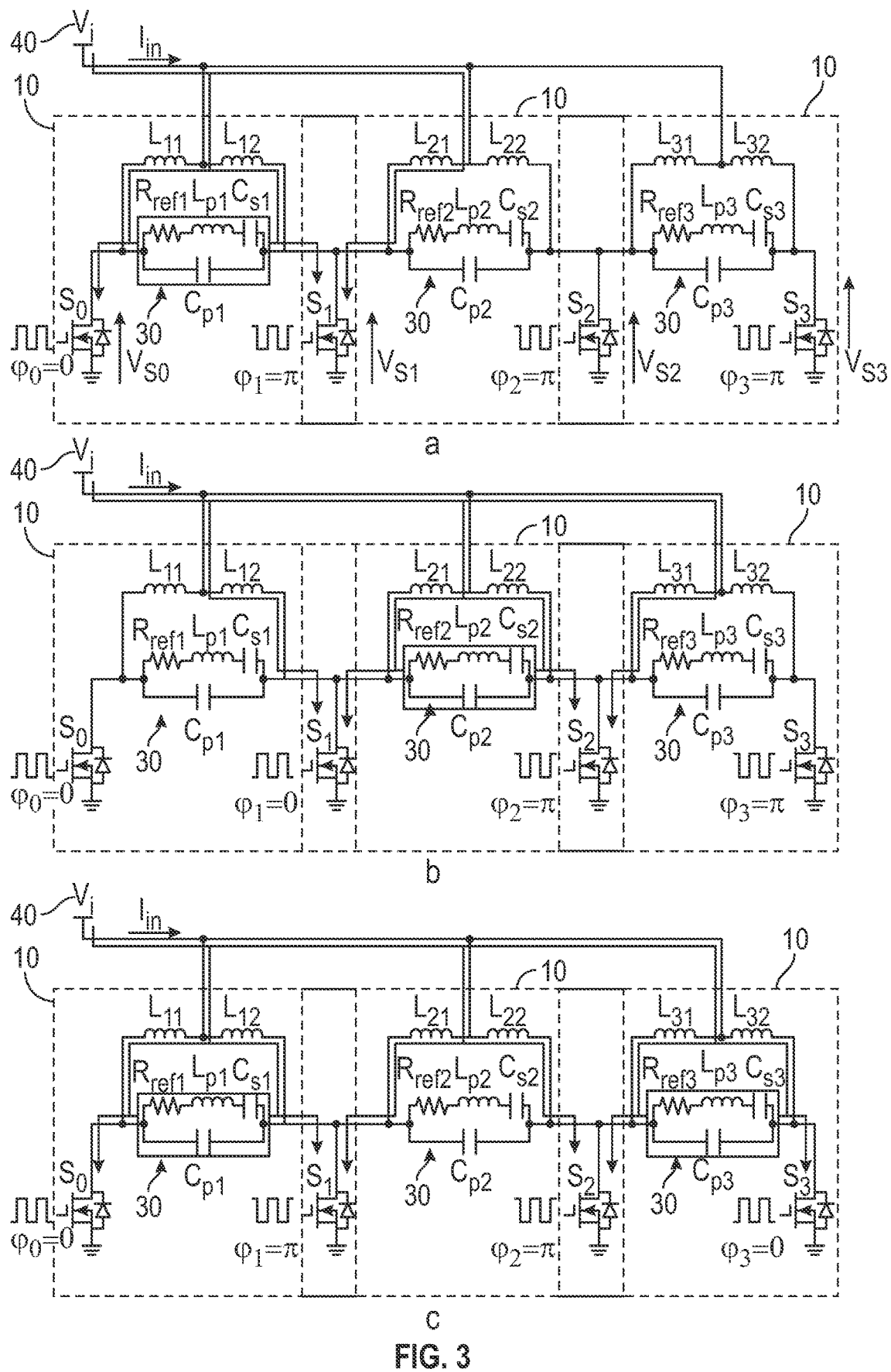
FIG. 3(a)-(c) show selected operating modes with different active modules according to an embodiment of the invention
Figure 4:
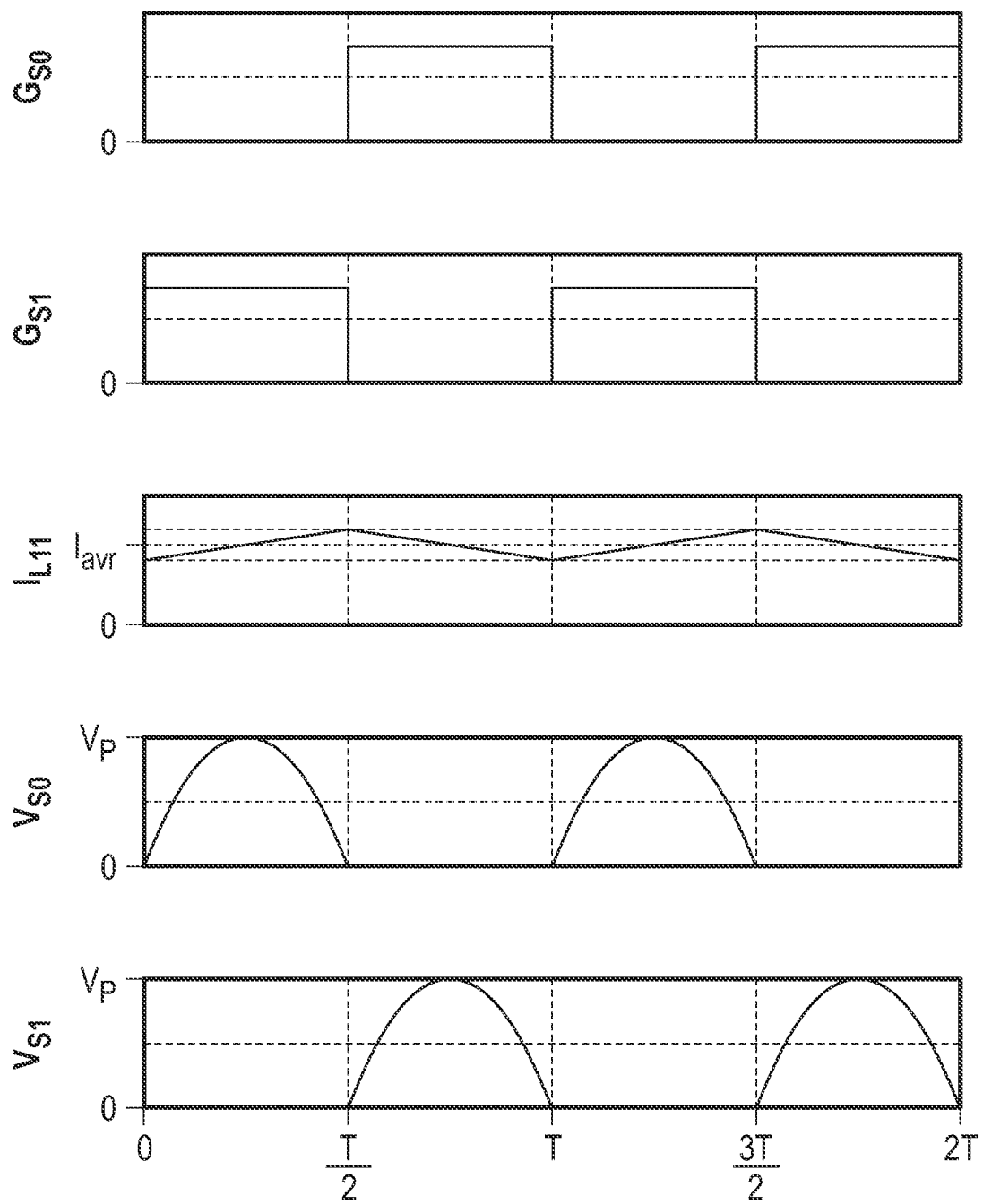
FIG. 4 shows voltage waveforms across the switches according to an embodiment of the invention

As will be appreciated in the light of FIG. 2, and as is shown in more detail in FIG. 3, driving a neighbouring pair of switches 18, 19 with 180° phase difference causes the corresponding coupler module 10 to turn ON, while operation of these switches 18, 19 in phase ensures the attached transmitter coil 12 is de-energised (de-activated). Therefore, to activate a specific primary coupler module 10, the two switches 18, 19 that are attached across the coupler module 10 should operate in a complementary manner.

FIGS. 3(a) to 3(c) illustrate the operating principles of an exemplary coupler array 1 including 3 coupler modules 10. The figure shows three different operating modes out of eight possible operating modes. For ease of reference in the Figure, switching elements 18, 19 of each of the coupler modules 10 will be referred to as switches $S_0$, $S_1$, $S_2$, and $S_3$. The respective inductances 14, 16 of each coupler module 10 will be referred to as $L_{11}$, $L_{12}$, $L_{21}$, $L_{22}$, $L_{31}$, and $L_{32}$, as per FIG. 3. The transmitter coils 12 of the respective modules will be referred to as $L_{p1}$, $L_{p2}$, and $L_{p3}$.

FIG. 3(a) illustrates an operating mode where the first coupler module 10, $L_{p1}$, is activated as an EV 20 reaches it. This is achieved by driving $S_1$, $S_2$ and $S_3$ at a 180° phase-shift with respect to $S_0$. The DC source 40, which is referenced as $V_{in}$, provides an average current $I_{in}$, which corresponds to power transferred to the EV through $L_{p1}$. In this specific mode, $I_{L11}$ is equal to $I_{in}/2$. Since $L_{12}$ and $L_{21}$ both share $S_1$, the remaining $I_{in}/2$ is shared equally between these two DC inductors making both $I_{L12}$ and $I_{L21}$ equal to $I_{in}/4$. The DC current flowing through $L_{22}$, $L_{31}$ and $L_{32}$ would be zero, as they are associated with the deactivated coupler modules. When $S_0$ is on and $S_1$-$S_3$ are off, $I_{in}$ flows through $S_0$. When $S_0$ is off and $S_1$-$S_3$ are on, the current through $S_1$ is Iin. The average current through $S_2$ and $S_3$ is zero in this mode.

When the EV moves forward and reaches the 2$^{nd}$ coupler module, the 2$^{nd}$ module is activated as shown in FIG. 3(b). In this operating mode, $S_1$ is driven at a 0 phase-shift with respect to $S_0$, while $S_2$ and $S_3$ are driven at a 180 phase-shift. Therefore, $L_{12}$ and $L_{21}$ as well as $L_{22}$ and $L_{31}$ source the current that drive the second coupler module $L_{p2}$. Thus, $S_1$ and $S_2$ conduct $I_{in}$ when they are on. Since $L_{12}$ and $L_{21}$ both share $S_1$, $I_{L12}$ and $I_{L21}$ equal to $I_{in}/4$. Similarly, $I_{L22}$ and $I_{L31}$ also equal to $I_{in}/4$. The average current in $L_{11}$ and $L_{32}$ as well as $S_0$ and $S_3$ is zero as the coupler modules attached to these are deactivated.

In FIG. 3(c), the first load (for example a first EV) is assumed to reach the third coupler module while a second load (for example a second EV) reaches to the first coupler module. To power both EVs, the first and the third coupler modules are energized. This is achieved by driving $S_1$ and $S_2$ at a 180° phase-shift with respect to $S_0$, while $S_3$ is driven at a 0° phase-shift. Current flowing through $L_{11}$ and $L_{32}$ would be equal to $I_{in}/4$ while all other DC inductors conduct $I_{in}/8$. Current flowing through all the switches in this mode would have an average value equal to $I_{in}/2$.

To help design a dynamic IPT system based on the proposed PPCA, the current in the primary coupler along with the current in the DC inductors and switches are required to be modelled mathematically. To simplify the analysis, it is assumed that the operating Q of each push-pull converter is high and the switching frequency as well as the damped natural frequency is the same as the natural resonant frequency, $f_0$, of each LC network. Under these conditions, the voltage across each switch when turned-off can be modelled as the positive half of a sinusoidal signal given by, $$V_{sn} = \begin{cases} 0 & G_{sn} : \text{ON} \\ V_p \sin(\omega_0 t) & G_{sn} : \text{OFF} \end{cases} \quad (1)$$

where $V_p$ is the peak voltage across the switch and $\omega_0$ is the natural resonant frequency of each LC compensation network given by, $$\omega_0 = \frac{1}{\sqrt{L_{pn}\left(\frac{C_{pn}C_{sn}}{C_{pn}+C_{sn}}\right)}}$$

In steady-state, based on the volt-second rule, the average voltage across each DC inductor is equal to zero as given by, $$\frac{1}{L_{n1}} \int_0^{\frac{T}{2}} [V_i - V_p \sin(\omega_0 t)] dt + \frac{1}{L_{n1}} \int_{\frac{T}{2}}^T V_i dt = 0 \quad (2)$$

A relationship between $V_i$ and $V_p$ can be derived by solving (3) as given by, $$V_p = \pi V_i \quad (3)$$

The voltage across the LC network is $V_{sn}-V_{sn-1}$. Thus, RMS value of the current in each LC compensation network can be calculated as, $$I_{C_{pn}} = I_{L_{pn}} = \frac{\pi V_i \omega_0 C_{pn}}{\sqrt{2}} \quad (4)$$

Considering $R_{refn}$ as the average resistance reflected by the pick-up moving over the primary, the average current supplied by $V_i$ when only a single coupler module 10 is activated can be derived as:

$$I_{in} = \frac{2\pi V_i R_{refn} C_p}{L_{effn} \sqrt{2}} \quad (5)$$

where $$L_{effn} = L_{pn} - \frac{1}{\omega_0^2 C_{sn}}$$

As mentioned above, the average current of DC inductors attached to the de-activated coupler modules 10 is zero. However, since the switches 18, 19 associated operate at a frequency $f_{sw}$, a current ripple appears in these inductors as they are charged by the correspondent switches in each cycle.

$$\Delta I_{Lmn} = \frac{V_i}{L_{mn} f_{sw}} \quad (6)$$

Where $f_{sw}$ is switching frequency, which is chosen to be slightly lower than the natural resonant frequency of the tank to guarantee ZVS condition for all the switches.

A 3.3 kW example system of the 3-coupler array that was analysed in the preceding section has been designed and simulated using LTspice. Circuit parameters of this system are given in Table I.

TABLE I

SIMULATION PARAMETERS

| Parameters | Value |
| --- | --- |
| $V_i$ | 300 V |
| $L_{n1}$ | 2 mH |
| $L_{n2}$ | 2 mH |
| $R_{refn}$ | 2.5 Ω |
| $L_{pn}$ | 64 μH |
| $C_{sn}$ | 110 nF |
| $C_{pn}$ | 110 nF |

Figure 5:
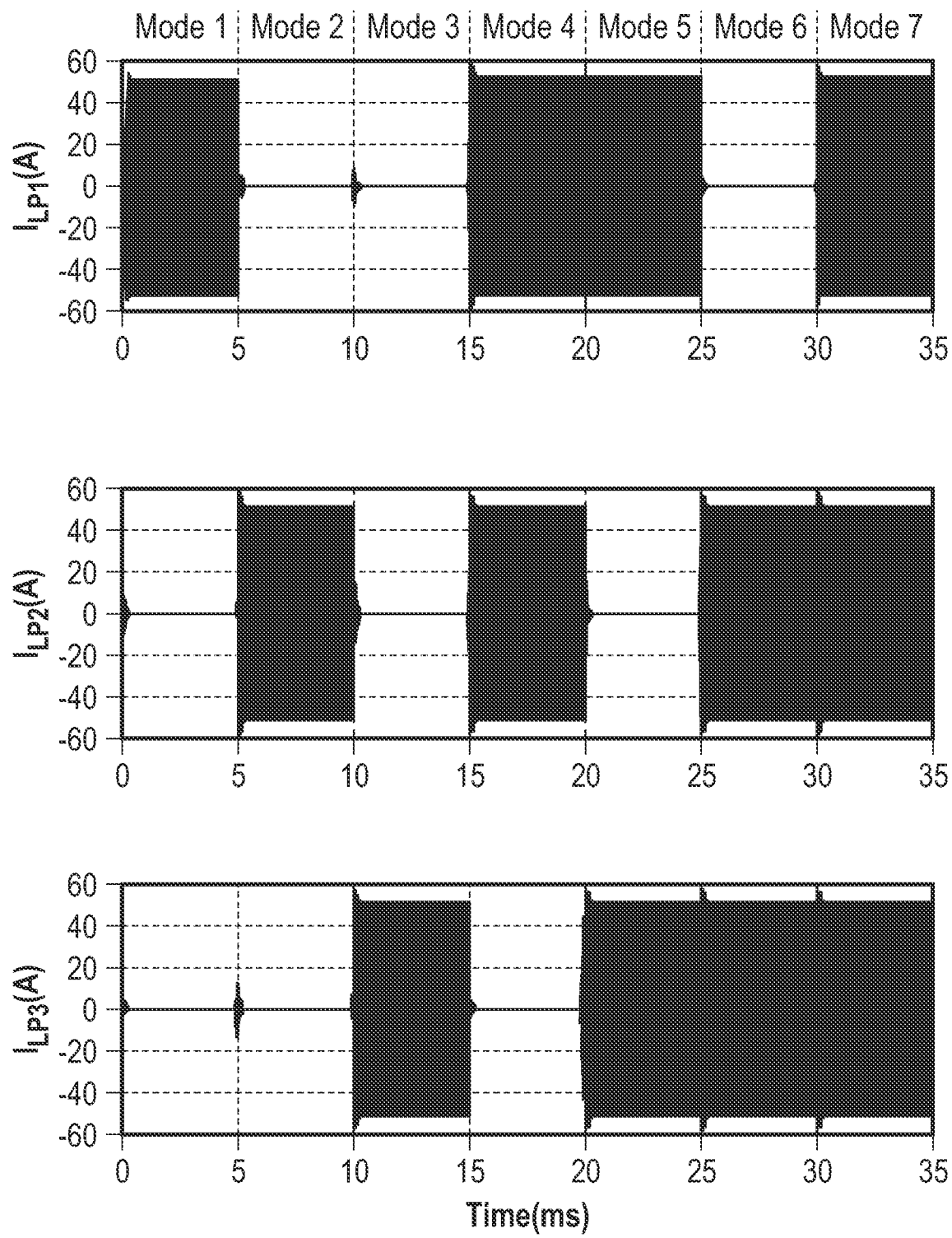
FIG. 5 shows graphs representing current in each coupler module of during different operating modes according to an embodiment of the invention
Figure 6:
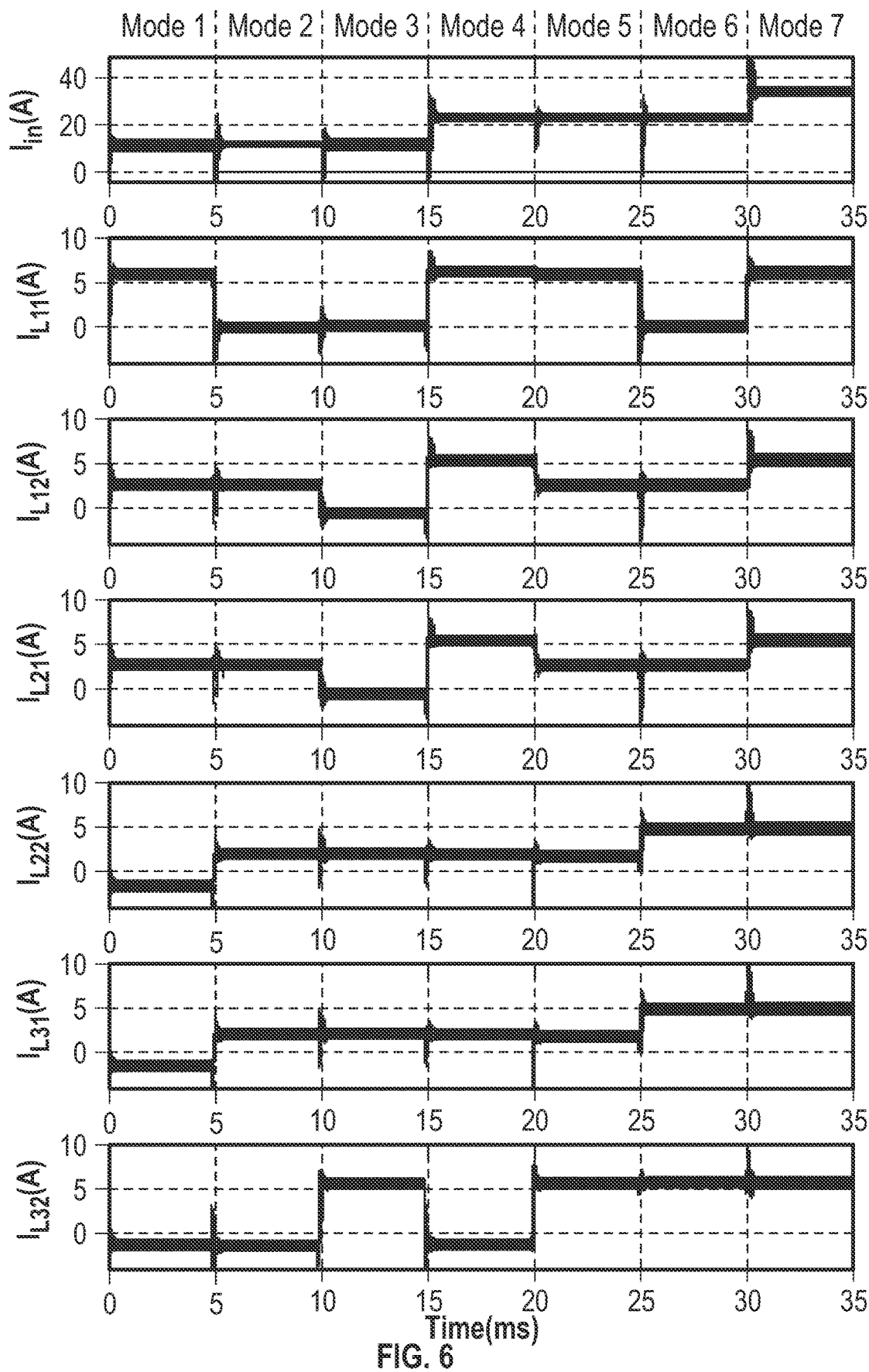
FIG. 6 shows graphs representing current in the individual DC inductors shown in FIG. 3 during different operating modes

Each operating mode is simulated over a 5 ms time interval before activating the next operating mode. The current in the coupler modules and the DC inductors are shown in FIG. 5 and FIG. 6 respectively. As evident from FIG. 5, from 0 ms to 5 ms, only the first one of the coupler modules 10 is activated. As discussed above and evident from FIG. 6, in this mode of operation $I_{L22}$, $I_{L31}$ and $I_{L32}$ are 0 since the second and third coupler modules 10 are deactivated. The PPCA delivers 3.3 kW to the EV through $L_{p1}$. As such, $I_{in}$ is 12 A, $I_{L11}$ is 6 A, $I_{L12}$ is 3 A and $I_{L21}$ 3 A.

After 5 ms the first coupler module is deactivated and the second coupler module is activated to illustrate the $2^{nd}$ operating mode. As evident from FIG. 6, the average current flowing through 11 and $L_{32}$ is equal to zero, while the other four DC inductors carry 3 A each. Since the PPCA delivers 3.3 kW to the EV, $I_{in}$ remains at 12 A.

The operating mode, where the first and the third coupler modules are activated, is demonstrated between 20 ms and 25 ms in FIG. 5 and FIG. 6. $I_{in}$ in this case is equal to 24 A as two coupler modules are activated concurrently to deliver 3.3 kW each to two EVs. Despite de-energizing the 2nd coupler module, all DC inductors carry a DC current. As such, $I_{L11}$ and $I_{L32}$ is equal to 6 A, and $I_{L12}$, $I_{L21}$, $I_{L22}$ and $I_{L31}$ are equal to 3 A.

Figure 7:
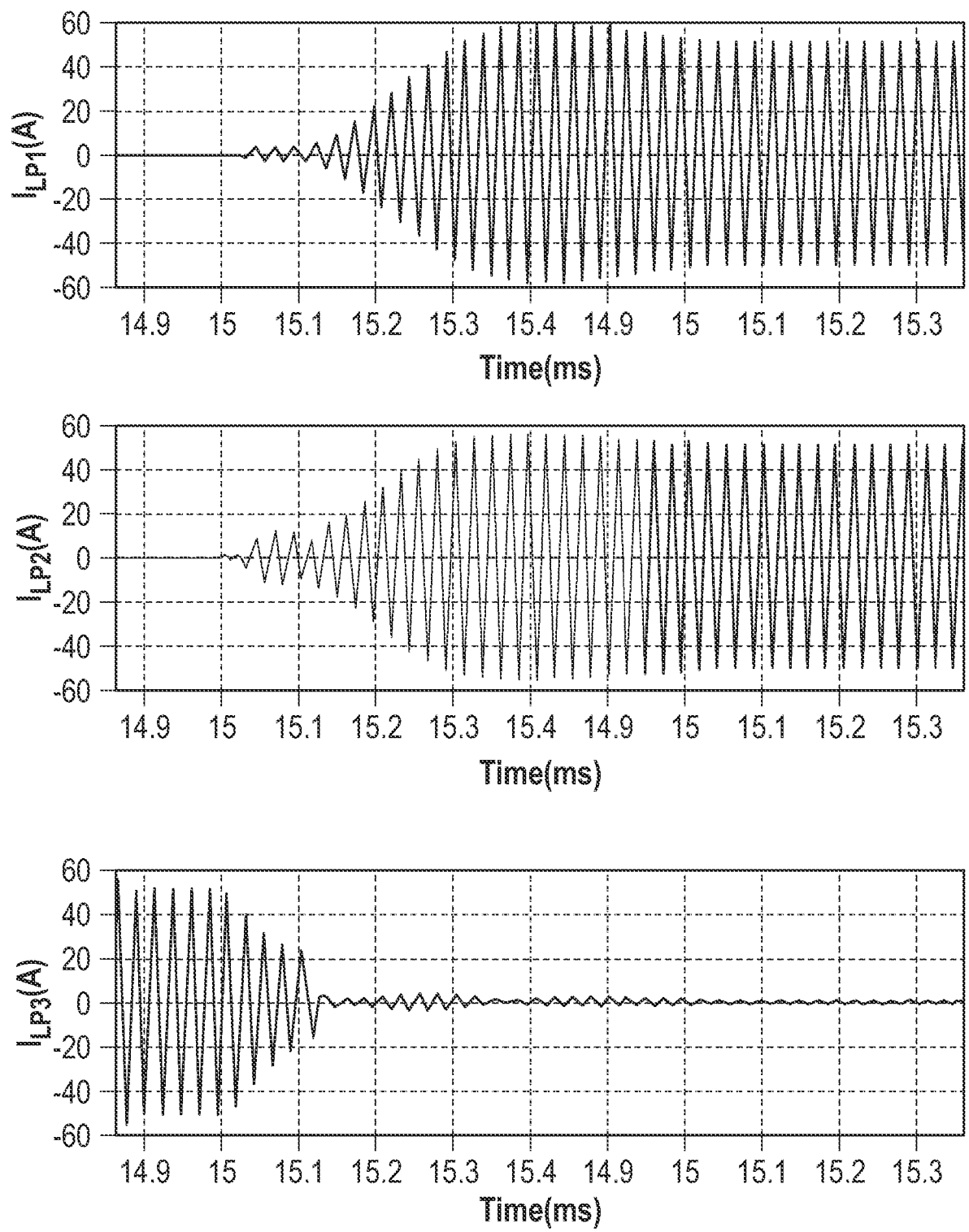
FIG. 7 shows graphs representing a transient response of a push-pull driven coupler array according to an embodiment of the invention

The transient response of the system is also an important factor in a dynamic IPT system as the coupler modules are activated only for a short duration. For example, an EV travelling at 100 km/h will only spend 28 ms over a 1 m long lumped coupler. Therefore, it is essential to be able to transition each coupler module between the activated and deactivated modes as fast as possible to efficiently transfer power to a fast moving EV. To illustrate the transient response of the proposed PPCA, transition from operating mode 3 to 4 is depicted in FIG. 7. In less than 200 μs, the current in Lp3 reaches 0 while current in $L_{p1}$ and $L_{p2}$ reaches the designed steady-state value of 36.5 Arms, confirming the ability of the PPCA to effectively switch between modes.

According to the invention, each coupler module 10 of the coupler array 1 can be activated and deactivated independently using a single switch and a simple control strategy. Since each coupler module 10 can be driven by a single switch, the system complexity, cost and reliability has been greatly improved, making it suitable for large-scale IPT based dynamic roadway systems.

Figure 8:
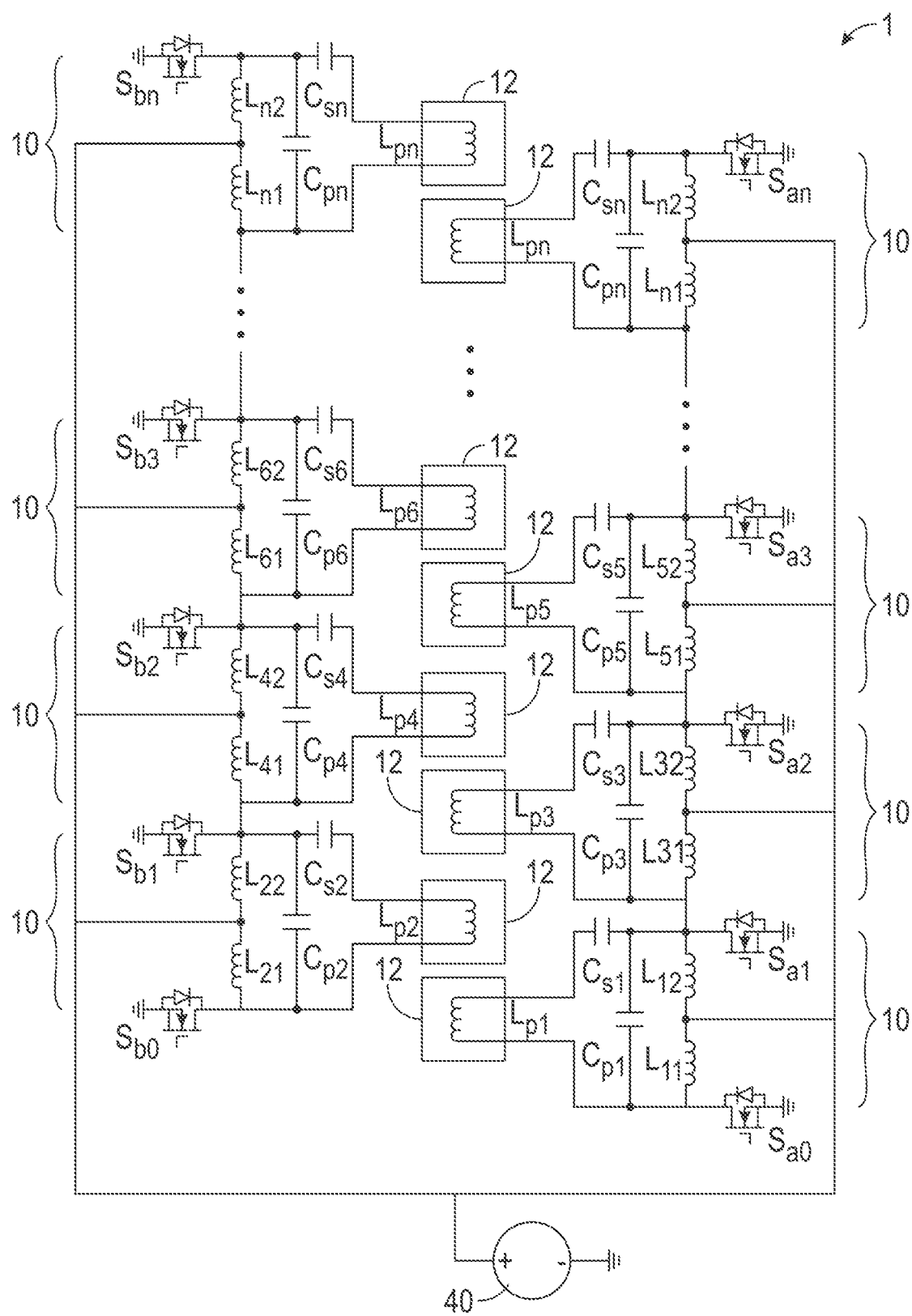
FIG. 8 shows an interleaved coupler array according to an embodiment of the invention

In the embodiment shown in FIG. 8, the coupler modules 10 are arranged with the modules or transmitting/coupling coils 12 of each array being spatially arranged in an interleaved or intermingled arrangement. These transmitter coils can be arranged or configured as an intermingled series array of coils, for example used to charge EV's (whether parked in a stationary position or moving over the array), or as an intermingled matrix of coils used to electronically control the field produced, for example being used in charging mats for consumer electronic devices such as mobile telephone or tablets. The relative phase and magnitude of currents or voltages of adjacent coupler modules 10 can be controlled to control the magnitude and form or pattern of the magnetic field generated to enable or improve power transfer. The interleaving/intermingling may be an alternating location of modules, or coils of the modules. Thus the coil of the first module of the first array may be adjacent to the coil of the first module of the second array, and the pattern may continue. The arrangement does not have to be linear and can for example comprise a matrix.

Figure 9:
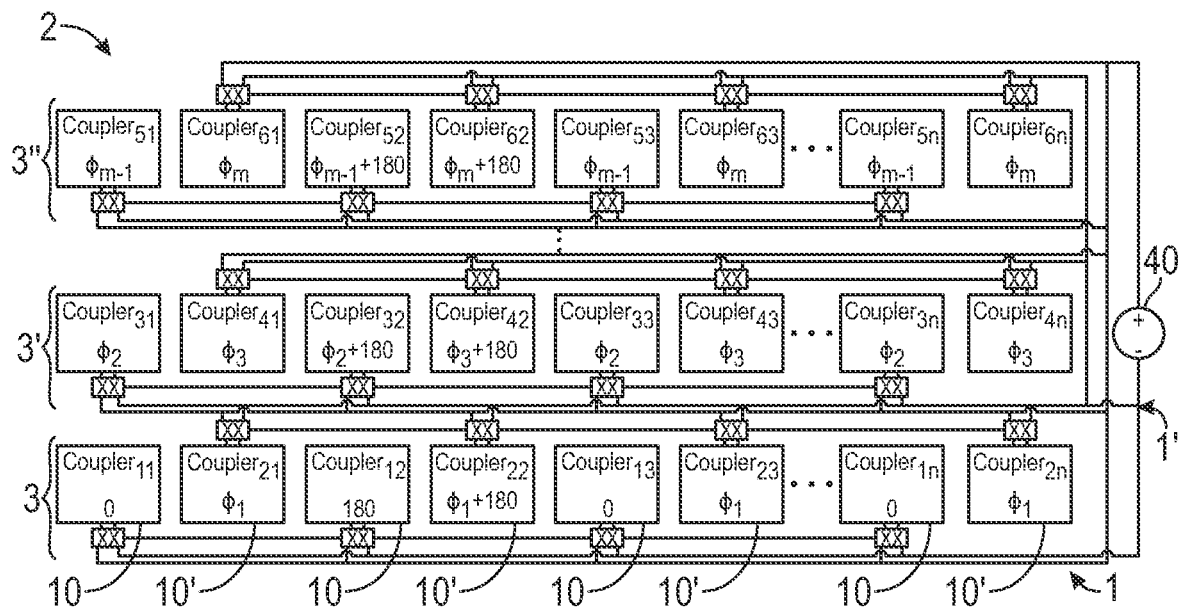
FIG. 9 shows a coupler system according to an embodiment of the invention

According to another aspect of the invention, which is illustrated in FIG. 9, there is provided an inductive power transfer (IPT) coupler system 2 comprising at least one, and generally multiple coupler legs 3, 3', 3" etc, each coupler leg 3, 3', 3" comprising at least two IPT coupler arrays 1, 1' as described in the foregoing, wherein in each coupler leg 3, 3', 3", the individual coupler modules 10 of the at least two IPT coupler arrays 1, 1' are spatially arranged in an interleaved/intermingled manner such that adjacent coupler modules 10 are part of different coupler arrays 1, 1'. Interleaving can also be viewed as grouping modules from different arrays.

In the figure, all coupler legs 3, 3', 3" are energised by a common power source 40. Alternatively, they can be energised using separate sources or using a power converter between each coupler array and the common power source.

Figure 10:
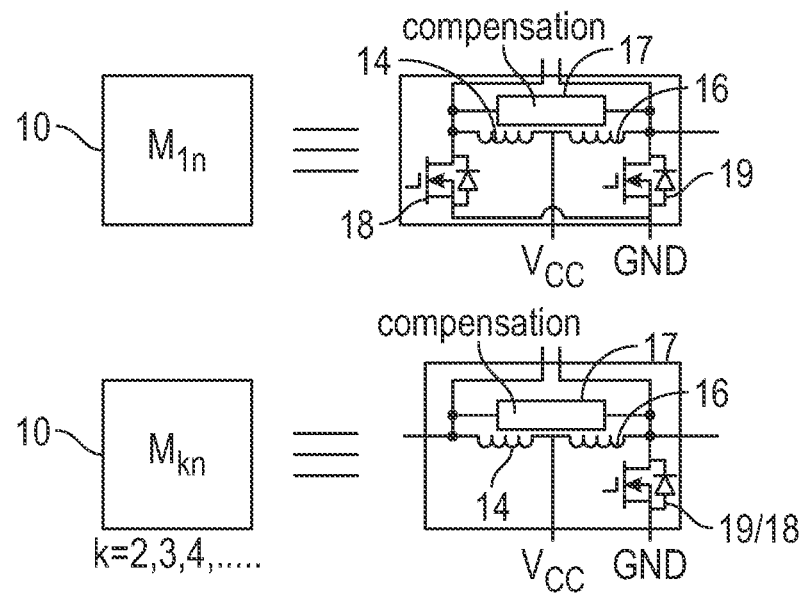
FIG. 10 shows module topologies according to an embodiment of the invention
Figure 11:
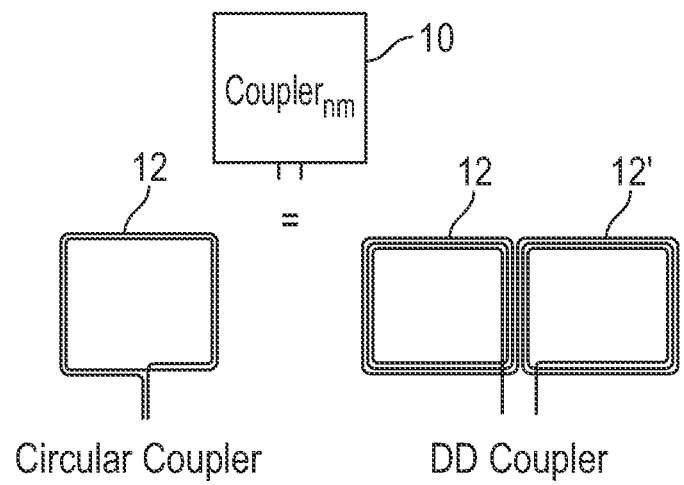
FIG. 11 shows transmitter coil arrangements according to embodiments of the invention

As can be taken from FIG. 10, each of the coupler modules 10 shown in FIG. 9 has a topology as explained in context with FIGS. 1 and 2, respectively. As shown in FIG. 11, the coupler modules 10 can have two transmitter coils 12, 12' made from a continuous winding to manipulate the resulting magnetic flux pattern of the coupler module 10.

Figure 12:
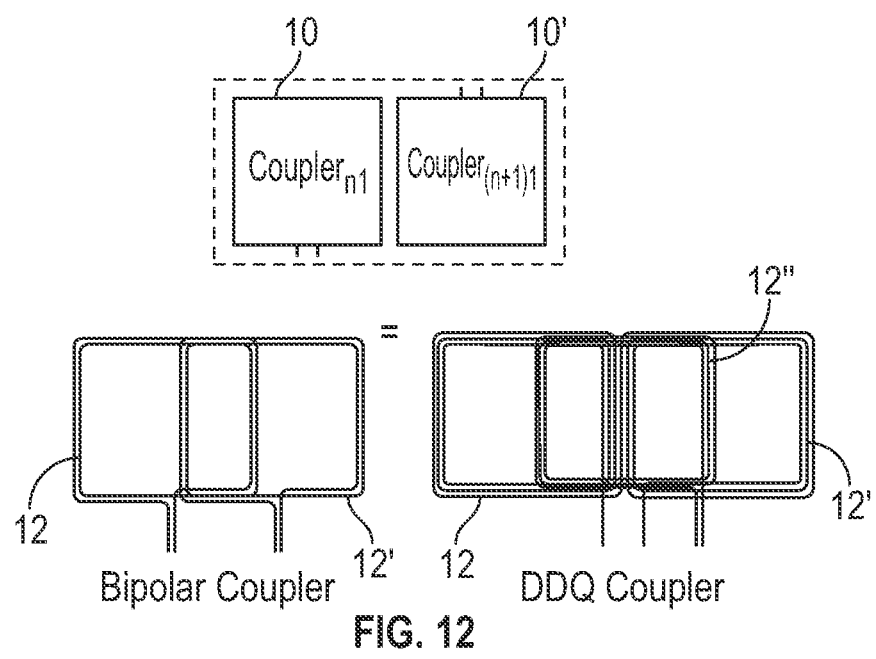
FIG. 12 shows transmitter coil arrangements according to embodiments of the invention, the transmitter coils belonging to different coupler modules
Figure 13:
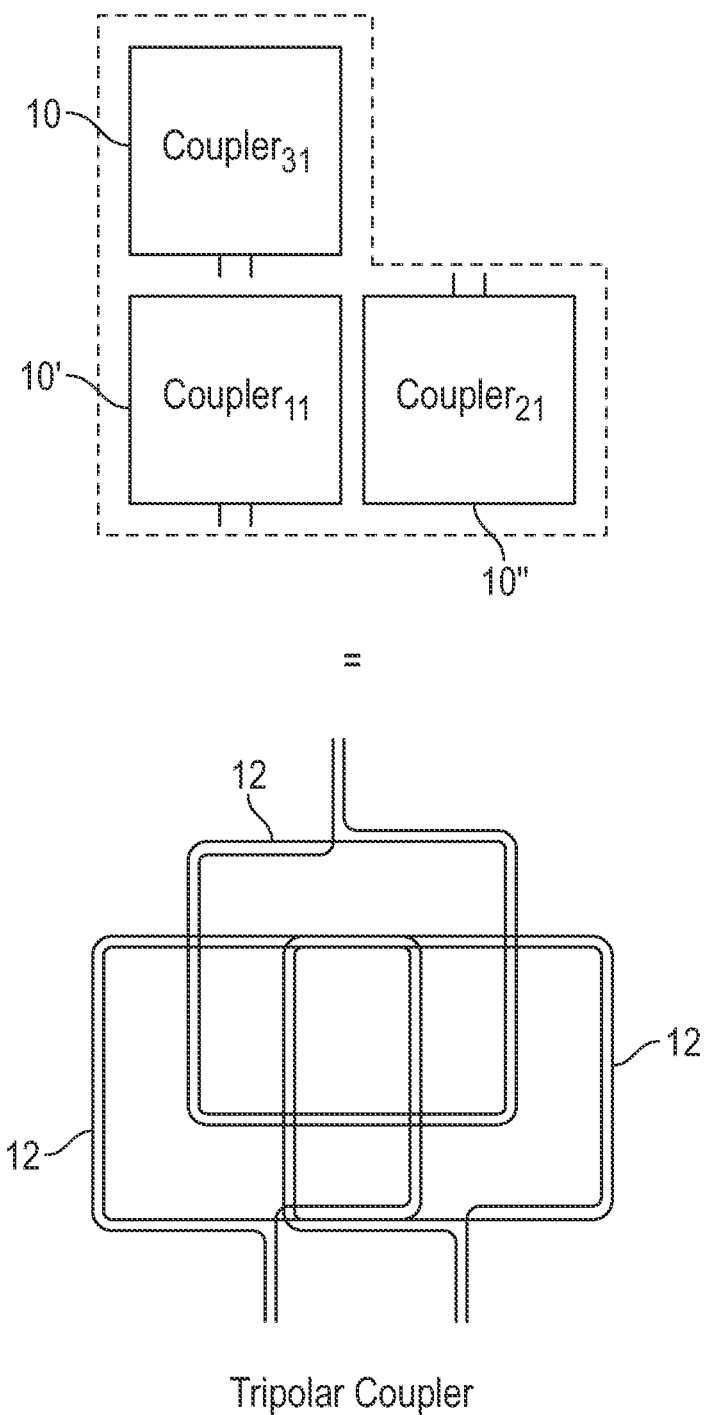
FIG. 13 shows transmitter coil arrangements according to embodiments of the invention, the transmitter coils belonging to different coupler modules

In other embodiments of the invention, shown in FIGS. 12 and 13, be it in the context of a single coupler array 1 or in the context of an IPT coupler system 2, two or more transmitter coils 12, 12', (and 12") of two or more coupler modules 10, 10' (and 10") can be arranged in an overlapping manner. By choosing the appropriate degree of overlap, the transmitter coils (whether single or multiple) are mutually decoupled, and it is possible to change the resulting vector of the magnetic flux field by adjusting phase angles and frequencies of the overlapping coils 12. It is also possible to energise a transmitter coil(s) of a module dependent on the location of the load without affecting the other modules. As shown in FIG. 13 the grouped modules may allow control of one or more of the position, magnitude, phase and orientation of a magnetic flux or field made available for reception by a load.

Figure 14:
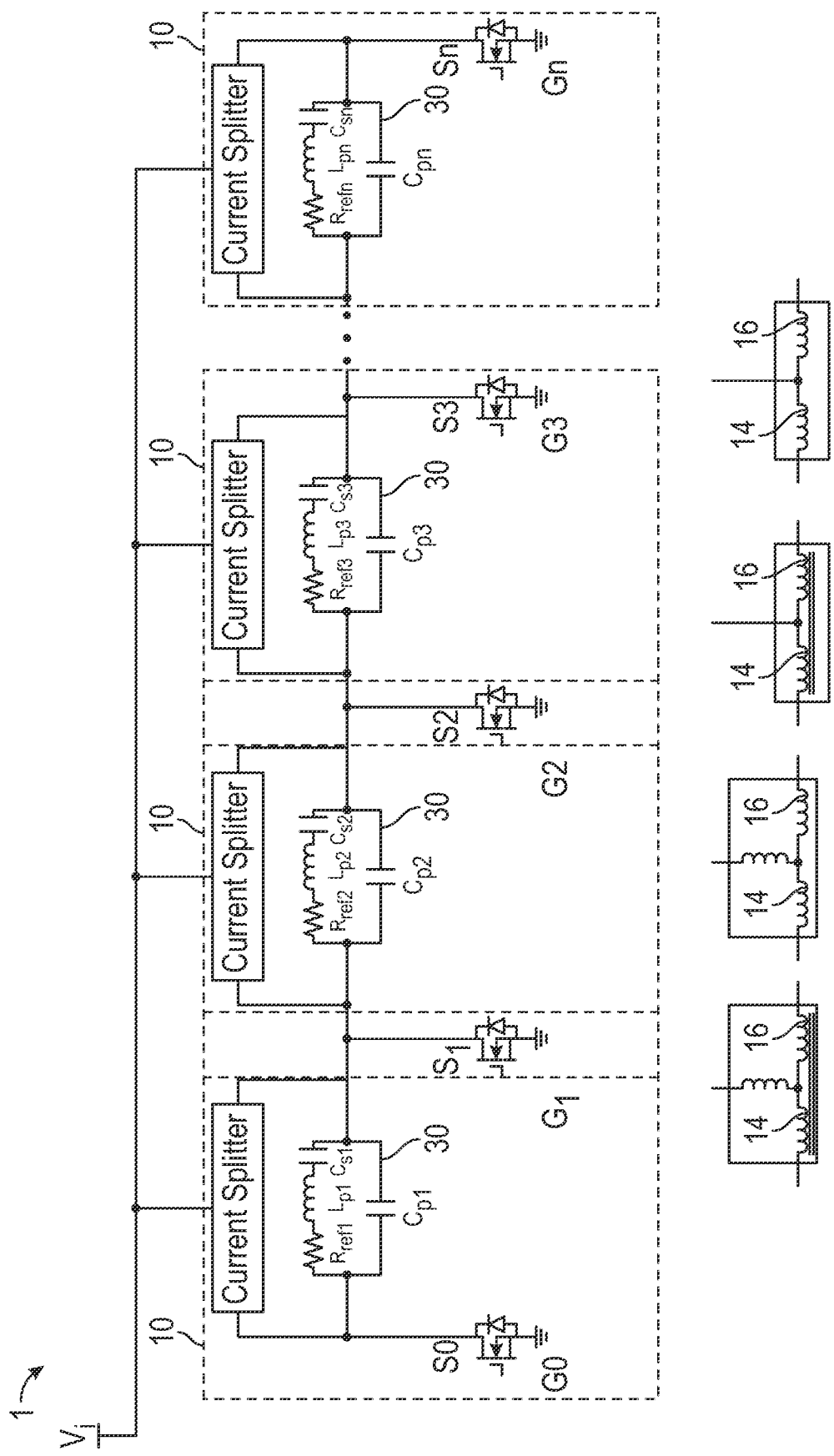
FIG. 14 shows a coupler array according to an embodiment of the invention and a set of different types of current splitter that can be used in it

FIG. 14 shows embodiments having different current splitters that can be used with the present invention, some of which comprise two inductances 14, 16 which are coupled with a magnetically permeable core, including ferrite for example.

Figure 15:
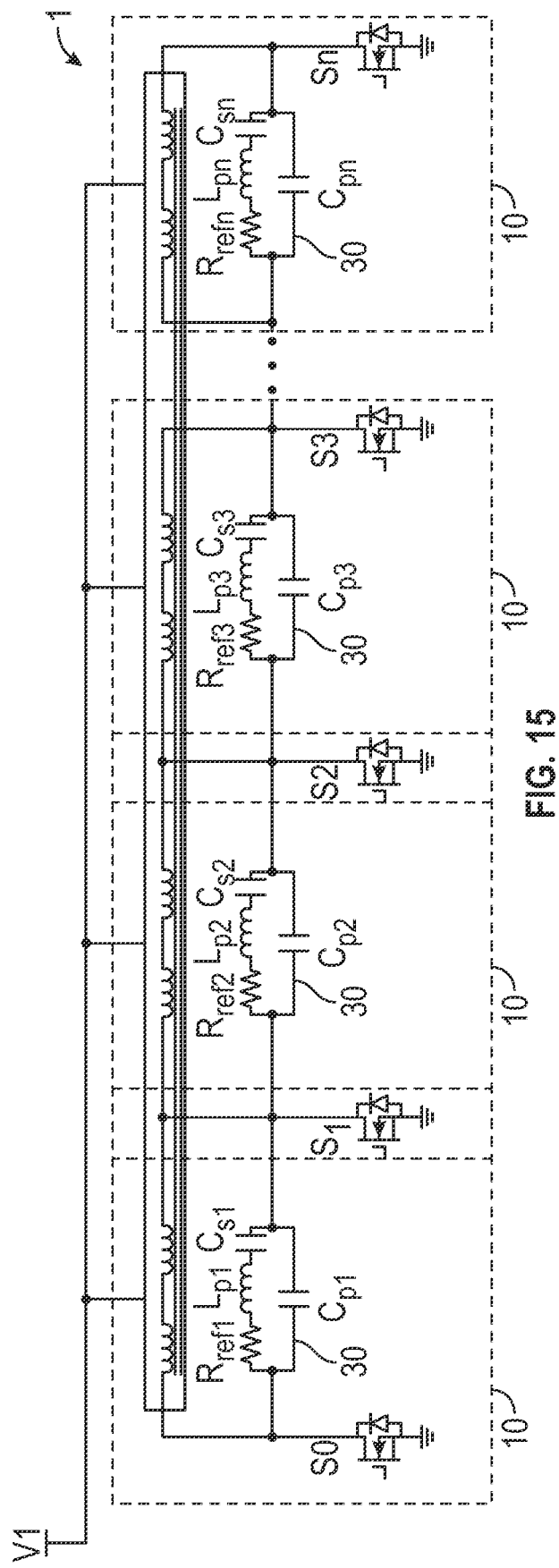
FIG. 15 shows a coupler array according to an embodiment of the invention in a multi-tap transformer topology

FIG. 15 shows embodiments of the invention using a multi-tap transformer topology.

Figure 16:
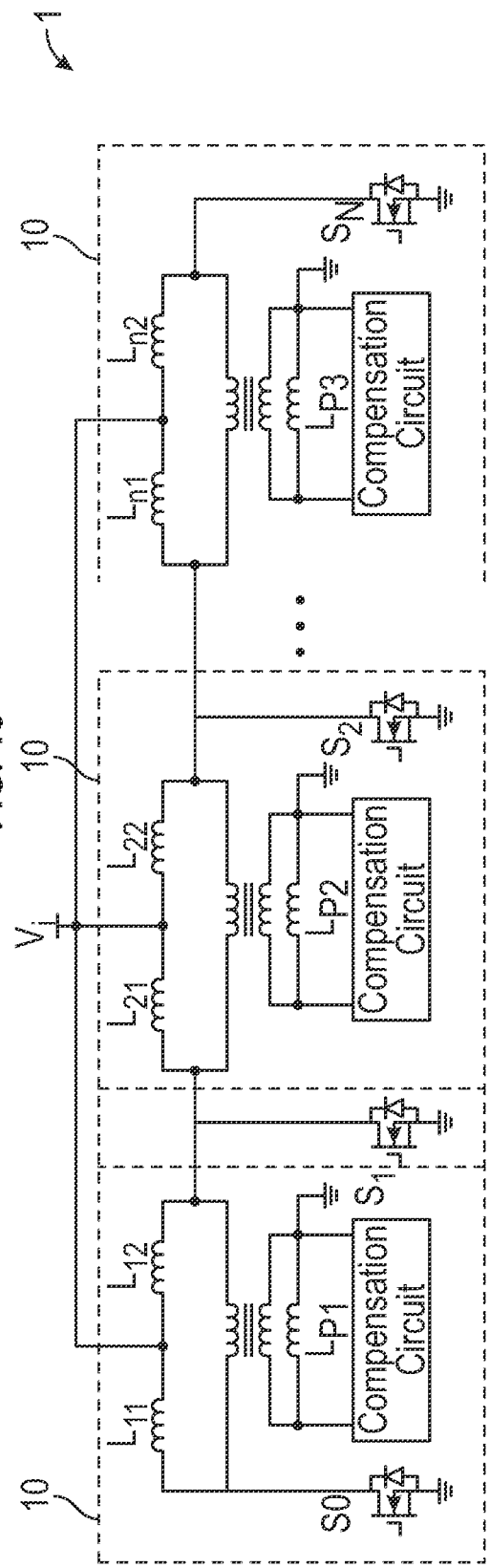
FIG. 16 shows a coupler array according to an embodiment of the invention in a high frequency isolation transformer topology

In the embodiment shown in FIG. 16, high frequency isolation transformers are included.

Figure 17:
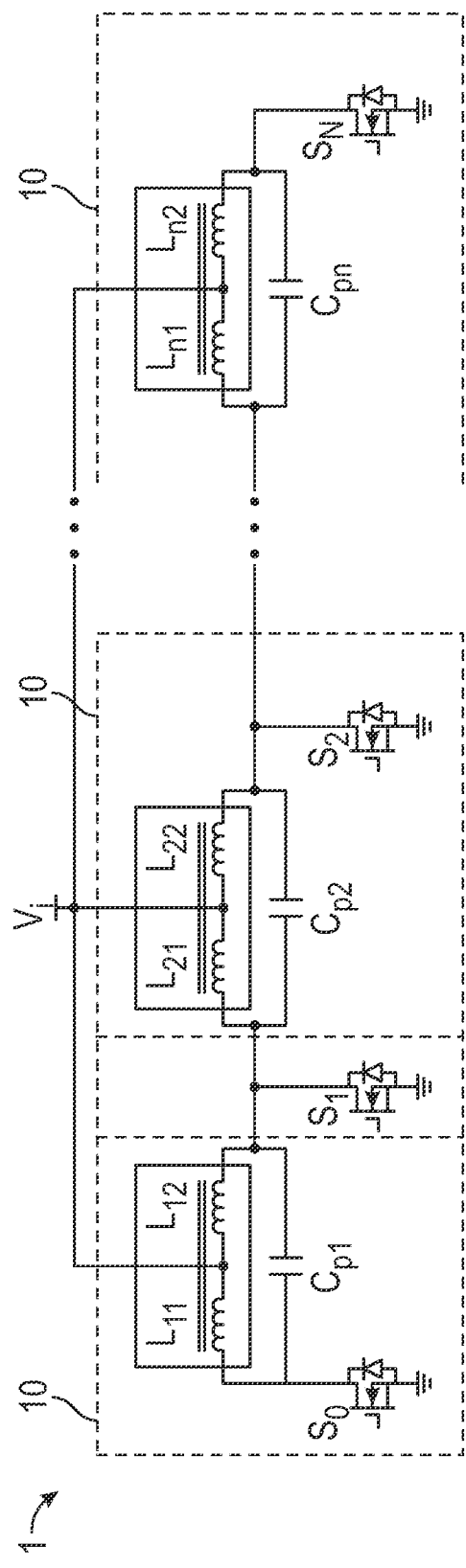
FIG. 17 shows a coupler array according to an embodiment of the invention integrated with centre-tapped DD couplers

FIG. 17 shows an embodiment of the invention with integrated centre-tapped DD couplers. The coupler modules 10 may generally be coupled (e.g. bifilar/centre tapped) or decoupled (e.g. bi-polar), or individual (e.g. square pads) coupler modules 10.

Figure 18:
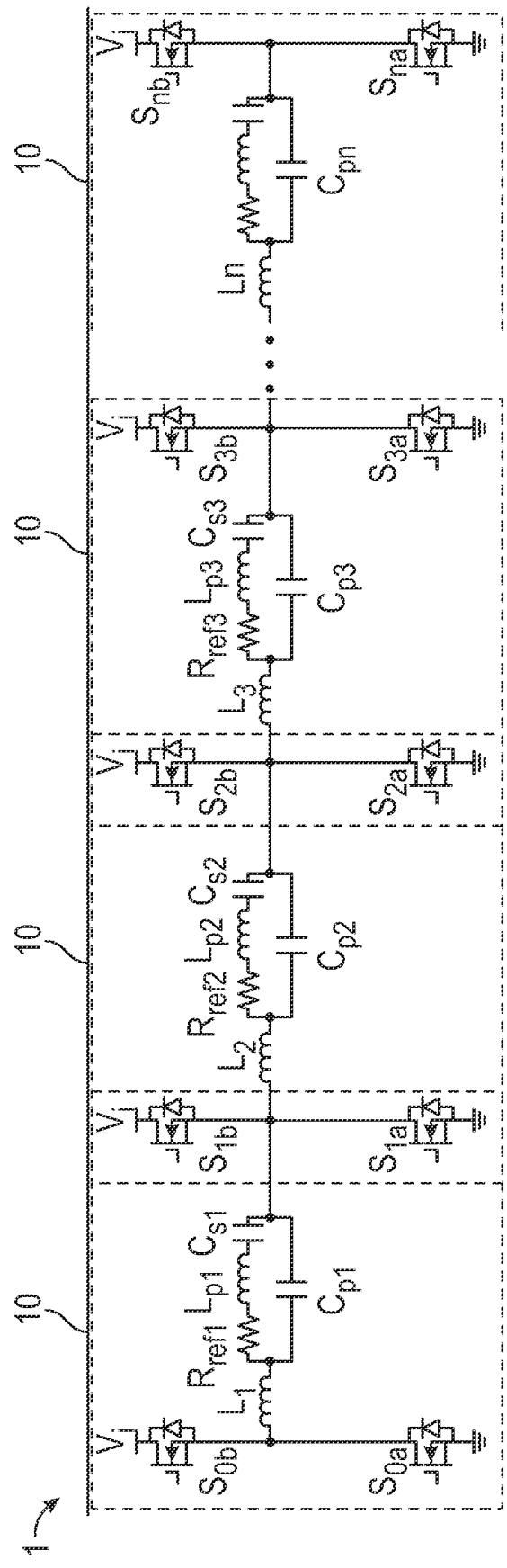
FIG. 18 shows a coupler array according to an embodiment of the invention in a voltage-fed coupler array topology

FIG. 18 demonstrates an array of LLC tuned coupler modules 10 which are supplied by a voltage fed converter. Each coupler module 10 consists of a half-bridge leg which can operate with either 0° or 180° phase shift with the adjacent module's half-bridge. Different types of compensation circuits and all other possible configurations explained for PPCA can be applied to voltage-fed coupler arrays.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. An inductive power transfer coupler array, comprising a plurality of coupler modules, wherein each of the plurality of coupler modules comprises a resonant circuit including at least one transmitter coil and a capacitive element, wherein each resonant circuit has a first end and a second end that are each connected to a first side of a power source,
a plurality of switching elements, wherein each of the plurality of coupler modules is connected to a second side of the power source by a respective pair of switching elements of the plurality of switching elements,
wherein each pair of switching elements comprises at least one shared switching element that forms part of another pair of switching elements such that each of the plurality of coupler modules is linked with at least one other of the other plurality of modules via a respective at least one shared switching element; and
a control module configured to control operation of each of the plurality of coupler modules between an active state in which the respective transmitter coil is energized, and a passive state in which the respective transmitter coil is not energized,
wherein the control module is configured to effect control between the active state and the passive state of a selected coupler module by controlling at least one of a phase angle or a duty-cycle of the respective pair of switching elements connecting the selected coupler module to the second side of the power source.

2. The inductive power transfer coupler array according to claim 1, wherein a respective current splitter or voltage splitter is connected across each respective resonant circuit to connect the first end and the second end of the respective resonant circuit to the first side of the power source.

3. The inductive power transfer coupler array according to claim 1, wherein the plurality of switching elements are semiconductor switches.

4. The inductive power transfer coupler array according to claim 1, wherein the control module is configured to switch the respective pair of switching elements at a phase angle of 180 degrees to operate the selected coupler module in the activate state, and at a phase angle of 0 degrees to operate the selected coupler module in the passive state.

5. The inductive power transfer coupler array according to claim 1, wherein the control module is configured to switch all of the plurality of switching elements at an identical fixed switching frequency.

6. The inductive power transfer coupler array according to claim 5, wherein all of the plurality of coupler modules have the same resonant frequency, and wherein the switching frequency is lower than or equal to the resonant frequency to achieve zero voltage switching (ZVS).

7. The inductive power transfer coupler array according to claim 1, a respective current is connected across each respective resonant circuit to connect the first end and the second end of the respective resonant circuit to the first side of the power source, and wherein each current splitter comprises at least two inductances coupled with a magnetically permeable core.

8. The inductive power transfer coupler array according to claim 1, wherein each of the plurality of coupler modules comprises at least two transmitter coils.

9. The inductive power transfer coupler array according to claim wherein the at least two transmitter coils are at least partially overlapping.

10. The inductive power transfer coupler array according to claim 9, wherein an overlap between the at least two transmitter coils is chosen such that the at least two transmitter coils are mutually decoupled.

11. The inductive power transfer coupler array according to claim 1, wherein at least each two of the plurality of coupler modules are arranged such that the respective transmitter coil or coils of the at least two coupler modules are overlapping.

12. The inductive power transfer coupler array according to claim 11, wherein in each set of overlapping transmitter coils an overlap is chosen such that the transmitter coils are mutually decoupled.

13. An inductive power transfer coupler system, comprising:
at least two coupler modules connected in parallel to a common power source, each coupler module comprising an associated resonant circuit including at least one transmitter coil and a capacitive element,
wherein both a first end and a second end of each resonant circuit is connected to a first terminal of the common power source and wherein each of the at least two coupler modules is connected across the associated resonant circuit to a second terminal of the common power source via an associated pair of switching elements,
wherein each of the at least two coupler modules is linked with another one of the at least two coupler modules at a shared at least one switching element; and
a control module configured to selectively control the operation of each of the at least two coupler modules between an active state in which the respective transmitter coil is energized, and a passive state in which the respective transmitter coil is not energized,
wherein the control module is configured to effect control between the active state and the passive state by controlling a phase angle of a pair of switching elements connected across an associated resonant circuit.

14. The inductive power transfer coupler system of claim 13, comprising a plurality of coupler legs each formed by two or more coupler modules wherein in each of the plurality of coupler legs, the individual coupler modules are arranged in at least one of a grouped manner or an interleaved manner such that adjacent coupler modules are part of different coupler arrays.

15. The inductive power transfer coupler system according to claim 14, wherein all coupler legs are energized by the common power source.

16. The inductive power transfer coupler system according to claim 14, including means to individually adjust a phase difference between individual coupler arrays.

17. An inductive power transfer coupler array, comprising:
- at least two coupler modules connected in parallel to a common power source, each coupler module comprising a resonant circuit including at least one transmitter coil and a capacitive element,
- a first plurality of switching elements including a plurality of first pairs of switching elements;
- a second plurality of switching elements including a plurality of second pairs of switching elements,
- wherein each of the at least two coupler modules is connected to a first terminal of the common power source via one of the plurality of first pairs of switching elements and is connected to a second terminal of the common power source via one of the plurality of second pairs of switching elements,
- wherein each coupler module is linked with at least one other coupler module at a shared pair of switching elements, each shared pair of switching elements including at least one of the first plurality of switching elements and at least one of the second plurality of switching elements; and
- a control module configured to selectively control the operation of each of the coupler modules between an active state in which the respective transmitter coil is energized, and a passive state in which the respective transmitter coil is not energized,
- wherein the control module is configured to effect control between the active state and the passive state of a selected one of the at least two coupler modules by controlling a phase angle of the first pair of switching elements and the second pair of switching elements connected to the selected one of the at least two coupler modules.

18. The inductive power transfer coupler array according to claim 17, wherein the first plurality of switching elements and the second plurality of switching elements are semiconductor switches.

19. The inductive power transfer coupler array according to claim 17, wherein each of the at least two coupler modules comprise at least two transmitter coils.

20. The inductive power transfer coupler array according to claim 19, wherein the at least two transmitter coils are at least partially overlapping.

* * * * *